(12) United States Patent
Ohta et al.

(10) Patent No.: US 9,010,846 B2
(45) Date of Patent: Apr. 21, 2015

(54) CAB FRAME FOR CONSTRUCTION MACHINERY AND PAINTING METHOD THEREFOR

(75) Inventors: Nobuyuki Ohta, Kawagoe (JP); Shinjirou Ohki, Hitachinaka (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 14/364,049

(22) PCT Filed: Sep. 14, 2012

(86) PCT No.: PCT/JP2012/073652
§ 371 (c)(1),
(2), (4) Date: Jun. 9, 2014

(87) PCT Pub. No.: WO2013/132683
PCT Pub. Date: Sep. 12, 2013

(65) Prior Publication Data
US 2014/0354010 A1 Dec. 4, 2014

(30) Foreign Application Priority Data
Mar. 7, 2012 (JP) ................. 2012-050519

(51) Int. Cl.
*E02F 9/16* (2006.01)
*E02F 9/08* (2006.01)
*B62D 21/18* (2006.01)

(52) U.S. Cl.
CPC ............... *E02F 9/163* (2013.01); *B62D 21/186* (2013.01); *E02F 9/0841* (2013.01)

(58) Field of Classification Search
CPC ....... E02F 9/163; E02F 9/0841; B62D 21/186
See application file for complete search history.

(56) References Cited

U.S. PATENT DOCUMENTS

| 4,050,735 A | 9/1977 | Molnar |
| 2003/0025357 A1 | 2/2003 | Fischer et al. |
| 2006/0017308 A1 | 1/2006 | Kojima et al. |

FOREIGN PATENT DOCUMENTS

| EP | 1249383 A2 | 10/2002 |
| JP | 5239214 A | 3/1977 |
| JP | 59167869 U | 11/1984 |

(Continued)

OTHER PUBLICATIONS

International Search Report (ISR) dated Dec. 18, 2012 issued in International Application No. PCT/JP2012/073652.

(Continued)

*Primary Examiner* — Pinel Romain
(74) *Attorney, Agent, or Firm* — Holtz, Holtz, Goodman & Chick PC

(57) ABSTRACT

A cab frame includes: a main structure having an opening on a part of an outer surface thereof; a rear structure separably connected to the main structure to cover the opening while projecting from the main structure; and first and second connectors provided to the main structure and the rear structure, respectively, the first and second connectors connected to each other in an abutted manner when the main structure and the rear structure are connected to each other. When the rear structure is connected to the main structure after being turned back to front relative to the main structure, the rear structure is temporarily fixable to the main structure via the first and second connectors. When the rear structure is turned back to front and connected to the main structure, the rear structure is housed in the main structure.

4 Claims, 8 Drawing Sheets

(56) References Cited

FOREIGN PATENT DOCUMENTS

| | | |
|---|---|---|
| JP | 60013865 U | 1/1985 |
| JP | 61174353 U | 10/1986 |
| JP | 2006036002 A | 2/2006 |
| JP | 2006037360 A | 2/2006 |

OTHER PUBLICATIONS

International Preliminary Report on Patentability (IPRP) including Written Opinion dated Sep. 9, 2014, issued in parent International Application No. PCT/JP2012/073652.

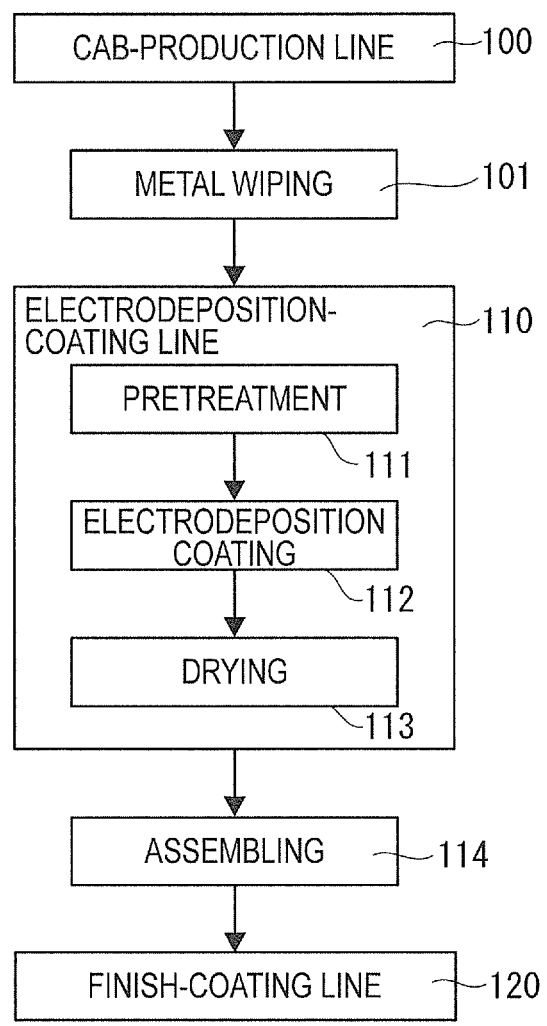

CAB FRAME FOR CONSTRUCTION MACHINERY AND PAINTING METHOD THEREFOR

TECHNICAL FIELD

The present invention relates to a cab frame for a large-sized construction machine such as a wheel loader and a coating method therefor.

BACKGROUND ART

There is already known a construction machine including a box-shaped cab in which an operator is seated, such as a wheel loader, a bulldozer and an excavator. The cab of such a construction machine includes a cab frame built by, for instance, welding metal plates. The cab frame is independently coated before being mounted on a vehicle body and a typical coating method for the cab frame is cationic coating according to which the cab frame is immersed in an electrodeposition bath with a material for cationic electrodeposition coating.

In some large-sized construction machines, a seat for a trainer is provided in the cab in addition to an operator seat. In such a case, the cab itself is also designed to be large for the necessity of increasing the space therein. Further, in order to meet a demand for, for instance, reclining an operator seat without sliding the operator seat forward, a rear space inside a cab is necessarily increased, which requires a size increase of the cab.

As the size of the cab is increased, a cab frame is also necessarily increased in size, so that the cab frame cannot be entirely immersed in an electrodeposition bath. In view of the above, according to some techniques, it may be possible to divide a cab frame into a plurality of frame parts and to assemble the divided frame parts after being separately immersed in an electrodeposition bath to be coated. For the purpose of improving productivity (not coating), Patent Literature 1 suggests a technique of dividing a cab frame into two, which is applicable to cab coating.

CITATION LIST

Patent Literature(S)

Patent Literature 1 JP-A-2006-36002

SUMMARY OF THE INVENTION

Problem(S) to be Solved by the Invention

When the technique as suggested by Patent Literature 1 is applied to coating, two divided frame parts are separately immersed in an electrodeposition bath, which results in increasing a man-hour for coating and thus in unintentionally lowering productivity.

An object of the invention is to provide a cab frame for a construction machine that can be efficiently coated without increasing a man-hour even when the cab frame is large in size, and a coating method therefor.

Means for Solving the Problem(s)

According to a first aspect of the invention, a cab frame for a construction machine includes: a main structure having an opening on a part of an outer surface thereof; a sub structure being separably connected to the main structure to cover the opening while projecting from the main structure; and first and second connectors being provided to the main structure and the sub structure, respectively, the first and second connectors being connected to each other in an abutted manner when the main structure and the sub structure are connected to each other, in which when the sub structure is connected to the main structure after being turned back to front relative to the main structure, the sub structure is fixable to the main structure via the first and second connectors, and when the sub structure is turned back to front relative to the main structure and connected to the main structure, the sub structure is housed in the main structure.

In a cab frame for a construction machine according to a second aspect of the invention, the main structure has the opening at a rear side thereof, the sub structure is a rear structure that is connected to the main structure to cover the opening of the main structure, and the main structure includes hollow upright columns being squarely arranged at intervals.

In a cab frame for a construction machine according to a third aspect of the invention, the construction machine includes columns for a roll over protective structure (ROPS), and the first and second connectors of the main structure and the rear structure each include right and left sides that are adjacent to the columns of the construction machine.

According to a fourth aspect of the invention, a coating method for a cab frame for a construction machine, the cab frame including: a main structure having an opening on a part of an outer surface thereof; a sub structure being connected to the main structure to cover the opening while projecting from the main structure; and first and second connectors being provided to the main structure and the sub structure, respectively, the cab frame being dividable at the first and second connectors of the main structure and the sub structure, the coating method includes: connecting the sub structure to the main structure after the sub structure is turned back to front relative to the main structure; fixing the sub structure to the main structure via the first and second connectors with the sub structure being housed in the main structure; and immersing the cab frame in a coating bath.

According to the first and fourth aspects of the invention, the cab frame is dividable into the main structure and the sub structure. When the sub structure is normally connected to the main structure, the sub structure projects from the main structure. In the preparation for coating, the sub structure is connected to the main structure after being turned back to front (i.e., in an inverse connection direction) to be housed in the main structure. In this manner, the sub structure does not substantially project from the main structure and thus the outside diameter of the cab frame is reduced. Therefore, the cab frame can be reliably immersed in the coating bath, which results in improved productivity.

It should be noted that the sub structure may be housed in the main structure not only for coating but also for relocation or transportation of the cab frame. The cab frame can thus be compactly packed and become easier to handle during operation.

According to the second aspect of the invention, the main structure is provided with the hollow columns squarely arranged at intervals, thereby increasing the rigidity of the main structure. Therefore, the main structure is prevented from deformation or the like irrespective of whether the sub structure is normally connected to the main structure or is connected to the main structure after being turned back to front (i.e., in the inverse connection direction).

Further, there may be a plurality of sub structures different in outside diameter (especially, projection amount from the main structure) so that the invention is applicable to construction machines different in type or specification. In the above case, since the main structure has a sufficient rigidity, any of the sub structures can be reliably connected to the main structure.

According to the third aspect of the invention, the first and second connectors of the main structure and the sub structure are reliably protected by the ROPS frame, thereby suppressing damages to the structures at the connectors. In this manner, the rigidity of the cab frame can be further increased.

BRIEF DESCRIPTION OF DRAWING(S)

FIG. 8 is a process chart for explaining a coating method for the cab frame.

DESCRIPTION OF EMBODIMENT(S)

Exemplary embodiment(s) of the invention will be described below with reference to the attached drawings.

Figure 1:
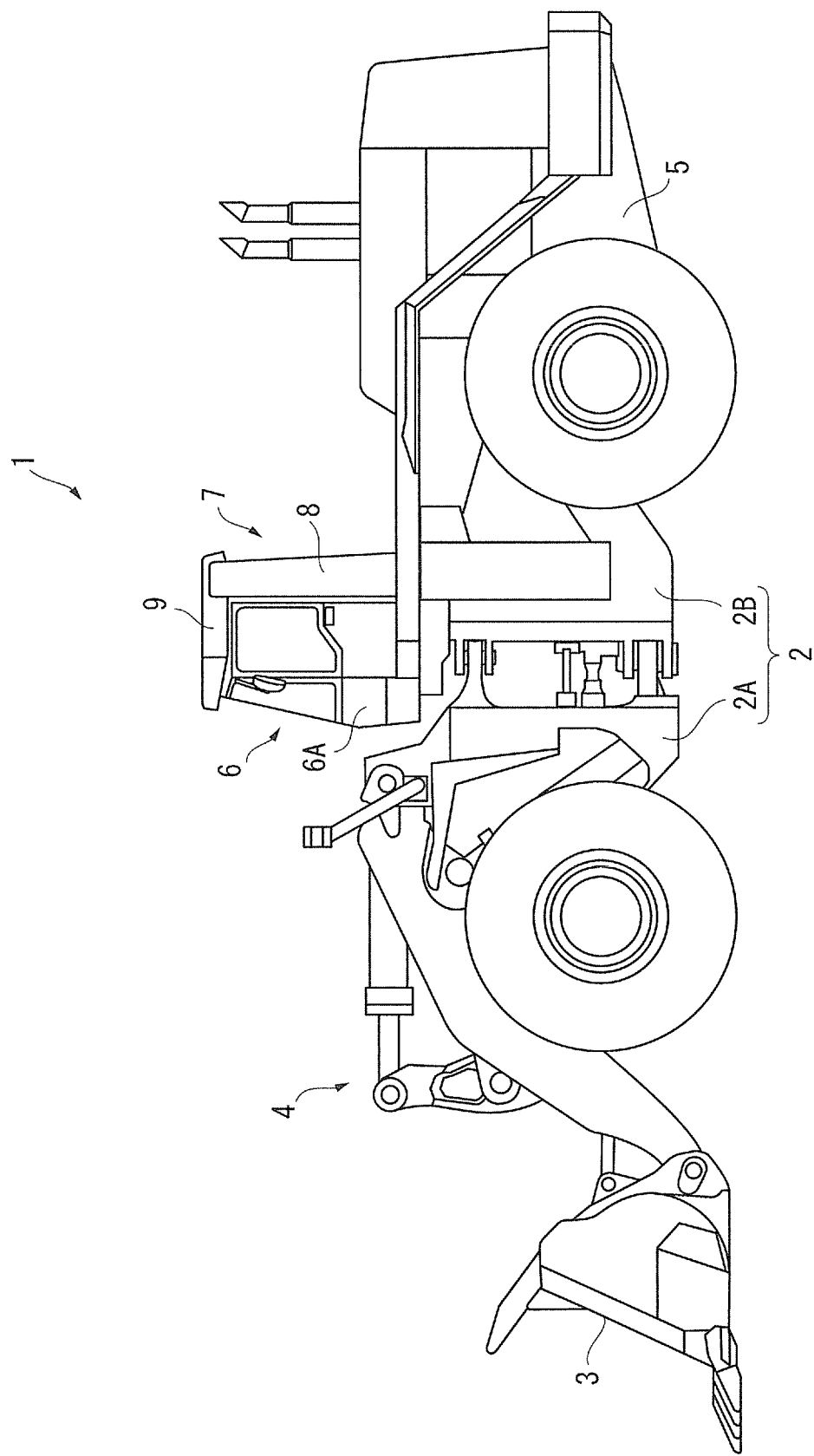
FIG. 1 is a side view showing the entirety of a construction machine according to an exemplary embodiment of the invention.

FIG. 1 is a side view showing a large-sized wheel loader 1 as a construction machine according to an exemplary embodiment. It should be noted that front/rear and right/left hereinafter mean front/rear and right/left defined when an operator is seated in a cab 6 as shown in FIG. 1.

As shown in FIG. 1, the wheel loader 1 includes a vehicle body 2 including a front vehicle body 2A and a rear vehicle body 2B. An excavating/loading bucket 3 is attached to a front side (a left side in FIG. 1) of the front vehicle body 2A via a hydraulic working-equipment-driving mechanism 4 including a boom, a bell crank, a connecting link, a bucket cylinder and a boom cylinder.

The rear vehicle body 2B includes a rear-vehicle-body frame 5 made of a thick metal plate or the like. A front side of the rear-vehicle-body frame 5 is provided with the box-shaped cab 6 where an operator is seated while a rear side of the rear-vehicle-body frame 5 is provided with, for instance, an engine and an engine-driven hydraulic pump (not shown).

The rear-vehicle-body frame 5 includes a ROPS (Roll Over Protective Structure) frame 7 designed to protect the cab 6 when the vehicle rolls over. The ROPS frame 7 includes: a pair of columns 8 that are located on both right and left behind the cab 6 and stand upright on the rear-vehicle-body frame 5; and a protector 9 that is located on and between upper portions of the columns 8. The protector 9, which is in the shape of an eave, projects forward to cover an upper side of the cab 6.

Figure 2:
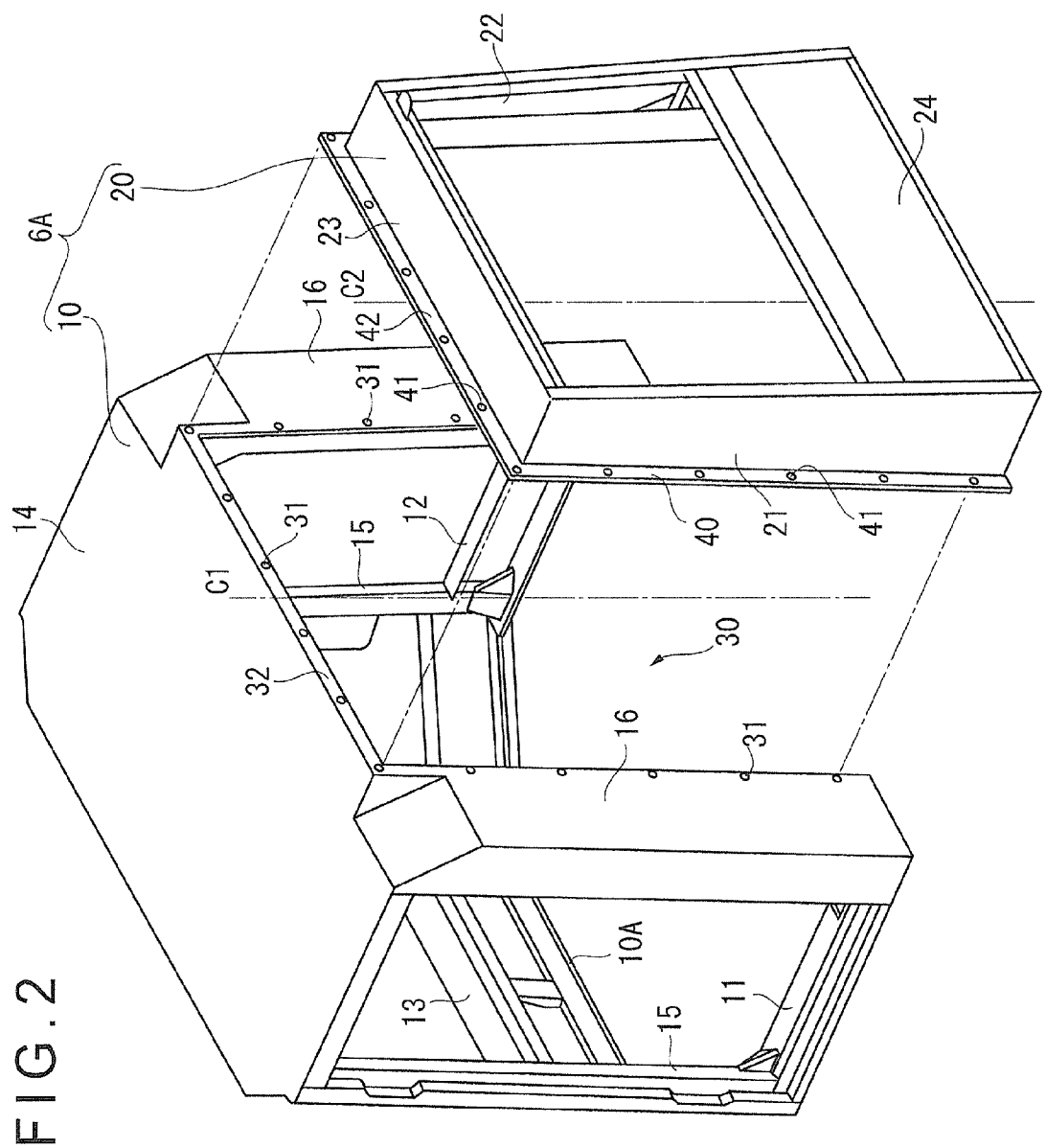
FIG. 2 is an exploded perspective view showing a cab frame of a cab mounted on the construction machine.
Figure 3:
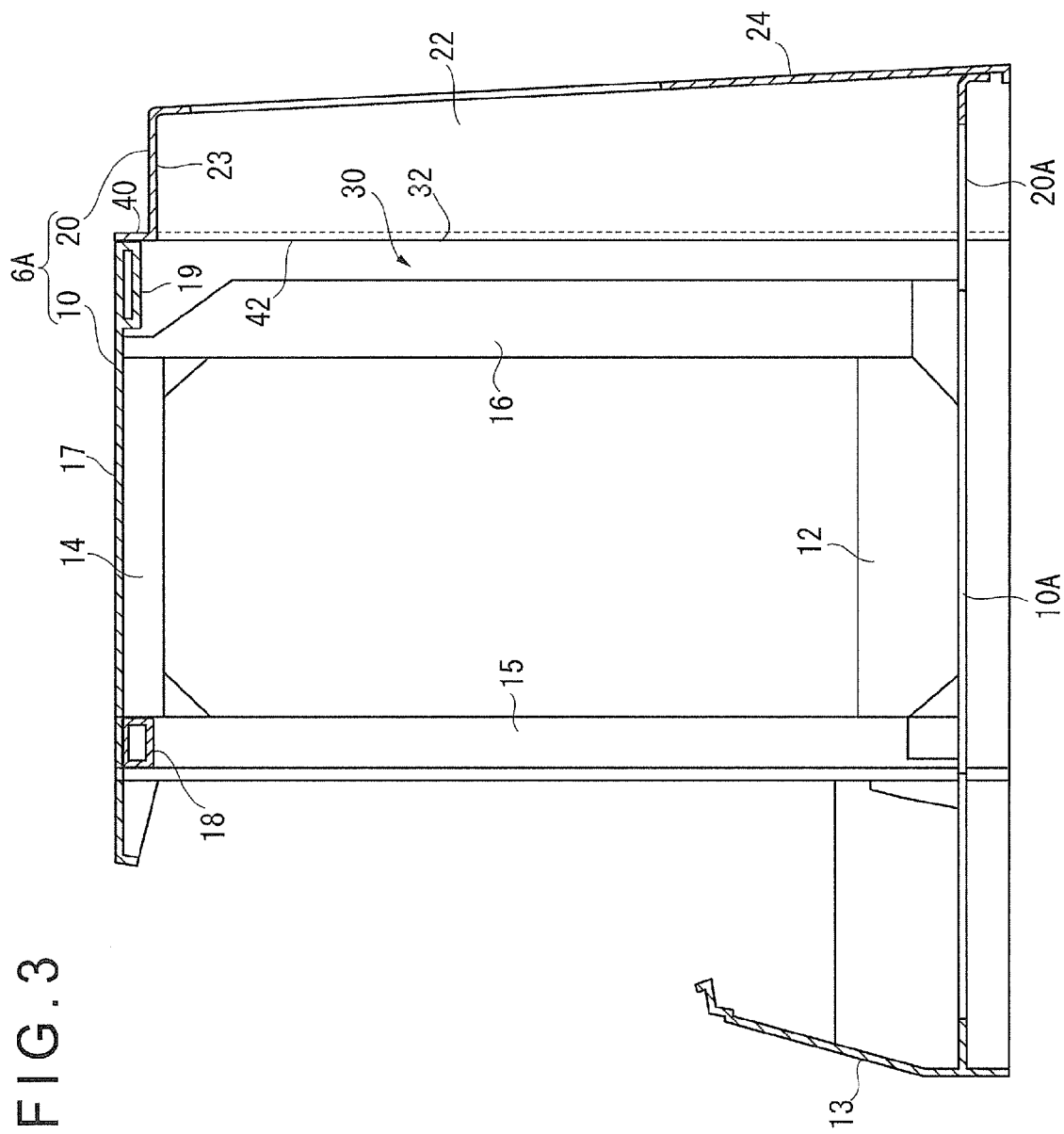
FIG. 3 is a sectional side view of the cab frame.
Figure 4:
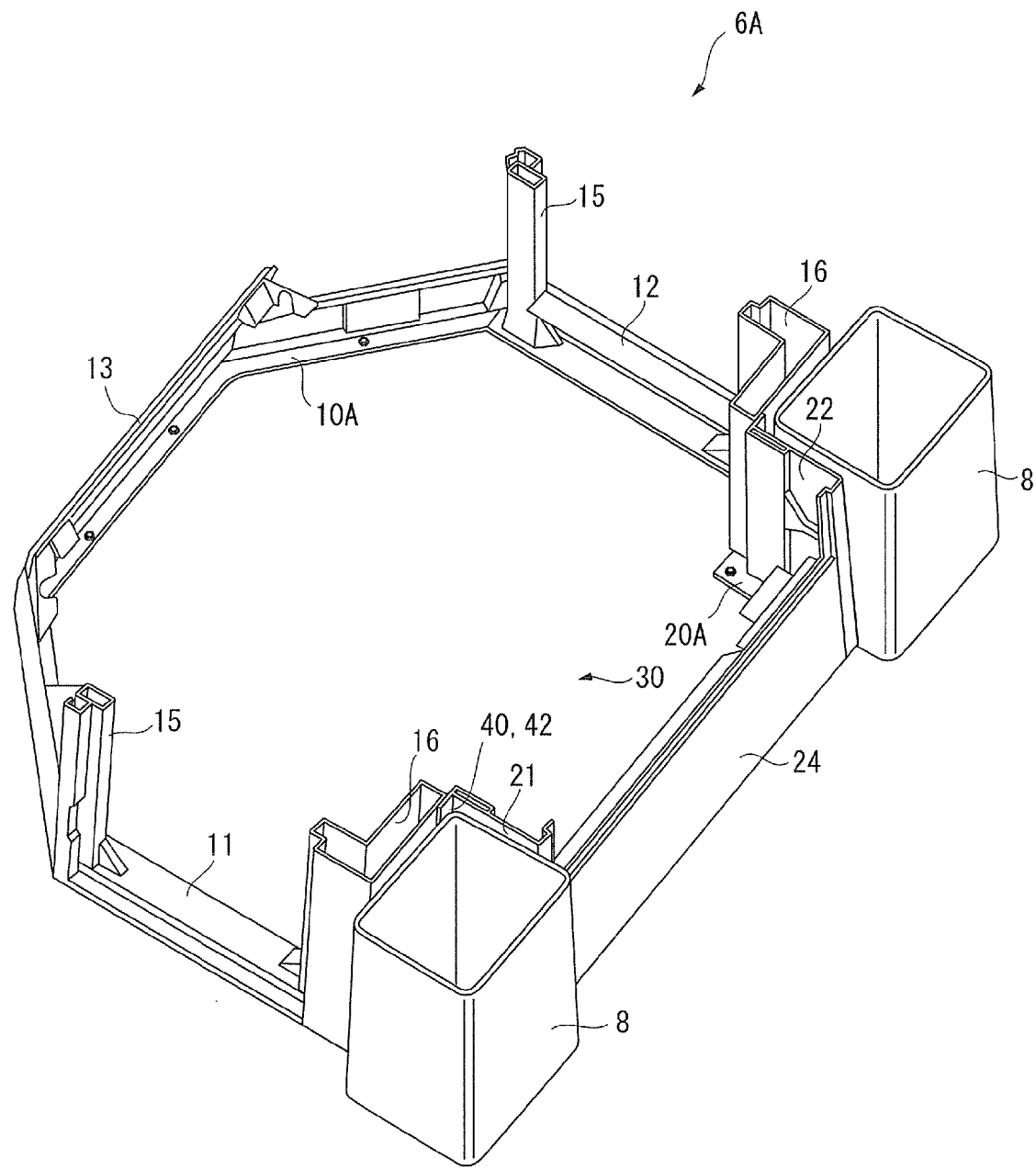
FIG. 4 is a perspective view showing a transverse section of the cab frame.

FIGS. 2 to 4 show a cab frame 6A of the cab 6. The cab frame 6A includes: a large main structure 10 located at a front side; and a rear structure 20 (i.e., a sub structure) located behind the main structure 10 and separably connected to the main structure. The main structure 10 and the rear structure 20 are each built by welding metal plate and/or hollow molded material in predetermined shapes to one another.

Specifically, the main structure 10 includes: frame-shaped preassembled right and left side panels 12, 11; a front panel 13 with right and left edges that are bonded to front lower portions of the side panels 12, 11, respectively; and a roof panel 14 that is located on and between upper portions of the side panels 12, 11 to serve as a roof.

The frame-shaped left side panel 11 has an opening to which a door for an operator to come in and out, is provided afterward. Similarly, the frame-shaped right side panel 12 has an opening in which a glass window is fitted. Each of the side panels 12, 11 is provided with front and rear hollow columns 15, 16 to increase the rigidity thereof. The section of the rear column 16 is much larger than the section of the front column 15. The rear column 16 has an L-shaped transverse section with a large rear portion. These columns 15, 16 are squarely arranged at intervals in the main structure 10.

The front panel 13 is in a shape with right and left sides that are bent rearward in a plan view to make a center in a right-and-left direction project forward. The front panel 13 covers a front side of a console located inside the cab 6. Three sheets of front glass are fitted in a front opening bounded by the side panels 12, 11, the front panel 13 and the roof panel 14, the three sheets of front glass being abutted side by side at bent portions of the front panel 13.

The roof panel 14 (not shown in detail) includes a rectangular frame and a plate 17 attached on a top of the frame. Specifically, the frame includes: a hollow transverse member 18 being located on and between upper ends of the columns 15 of the side panels 12, 11; a hollow transverse member 19 being located on and between upper ends of the columns 16; and a hollow longitudinal member being located on and between ends of the transverse members 18, 19 directly or via a gusset plate. A rear opening 30 bounded by the side panels 12, 11 and the roof panel 14 is closed by the rear structure 20.

The rear structure 20 includes: right and left side members 21, 22; a top member 23 being located on and between upper ends of the side members 21, 22; a rear member 24 being located between rear lower portions of the side members 21, 22; and a flange 40 being continuous along front edges of the side members 21, 22 and the top member 23. Rear glass is fitted in a rear opening bounded by the members 21, 22, 23 and 24 to ensure rearward visibility for an operator.

When seen in a projected image in a front-and-rear direction, the side members 21, 22 and the top member 23 have a shape slightly smaller than that of the opening 30. A right-and-left width of the rear structure 20, excluding the flange 40, is smaller by an amount approximately equal to widths of the rear portions of the columns 16 of the side panels 12, 11. Thus, when the main structure 10 and the rear structure 20 are assembled into the cab frame 6A by connecting them into one piece, reentrants recessed inward are formed at both right and left rear corners of the cab frame 6A. The columns 8 of the ROPS frame 7 are located correspondingly to the reentrants to be adjacent to later-described connectors 32, 42 (see FIG. 4).

Neither the main structure 10 nor the rear structure 20 has a bottom member serving as a floor. When the main structure 10 and the rear structure 20 are connected into one piece as the cab frame 6A and then mounted on the rear-vehicle-body frame 5 (see FIG. 1), a floor plate (not shown) substantially in a hexagonal shape in a plan view is used. Specifically, the main structure 10 of the cab frame 6A is mounted on a front side of the floor plate and the rear structure 20 of the cab frame 6A is mounted therebehind. An upper surface of the floor plate serves as the floor of the cab 6.

For the above arrangement, horizontal flanges 10A, 20A are provided inside the main structure 10 and the rear structure 20 near lower edges of the main structure 10 and the rear structure 20 at a predetermined level from the lower edges. The flanges 10A, 20A, which are continuous along contours of the structures 10, 20, are abutted against the upper surface of the floor plate and fixed to the floor plate with a bolt attached from below. Additionally, a damper mount is interposed between a lower surface of the floor plate and the rear-vehicle-body frame 5 at an appropriate position to suppress vibration, rolling, pitching or the like of the cab 6.

Next, description will be made on a connection arrangement between the main structure 10 and the rear structure 20.

A rear side (i.e., a part of an outer surface) of the main structure 10 is provided with the opening 30 bounded by the side panels 11, 12 and the roof panel 14, and the rear structure 20 is connected to cover the opening 30 as described above. When the structures 10, 20 are connected, respective internal spaces thereof are brought into communication with each other, so that the cab 6 can reliably have a large internal space.

The main structure 10 is provided with a plurality of bolt holes 31 arranged on vertical rear surfaces of the side panels 11, 12 and vertical rear end surface of the roof panel 14 along rims of the panels opposed to the opening 30. The bolt holes 31 are arranged in a symmetrical manner relative to a vertical symmetry line C1 passing through a center in the right-and-left direction, and a portion provided with the bolt holes 31 serves as a connector 32 of the main structure 10. The connector 32 is in a gate shape as a whole. Back nuts 33 are, for instance, welded on the back of the bolt holes 31 (see FIG. 7).

Similarly, the flange 40 of the rear structure 20 is provided with insertion holes 41 corresponding to the bolt holes 31. Specifically, the insertion holes 41 are likewise arranged in a symmetrical manner relative to a vertical symmetry line C2 passing through the center in the right-and-left direction, and a portion including the flange 40, which is provided with the insertion holes 41, serves as a connector 42 of the rear structure 20.

The connector 42 of the rear structure 20 is set opposed to the connector 32 of the main structure 10, the connector 42 is abutted against the connector 32, and bolts 50, which are inserted through the insertion holes 41 (see FIG. 7), are further inserted through the bolt hole 31 to be screwed into the back nuts 33, thereby connecting the structures 10, 20 to each other.

Description will be made below on a state of the cab frame 6A in a coating process.

Figure 5:
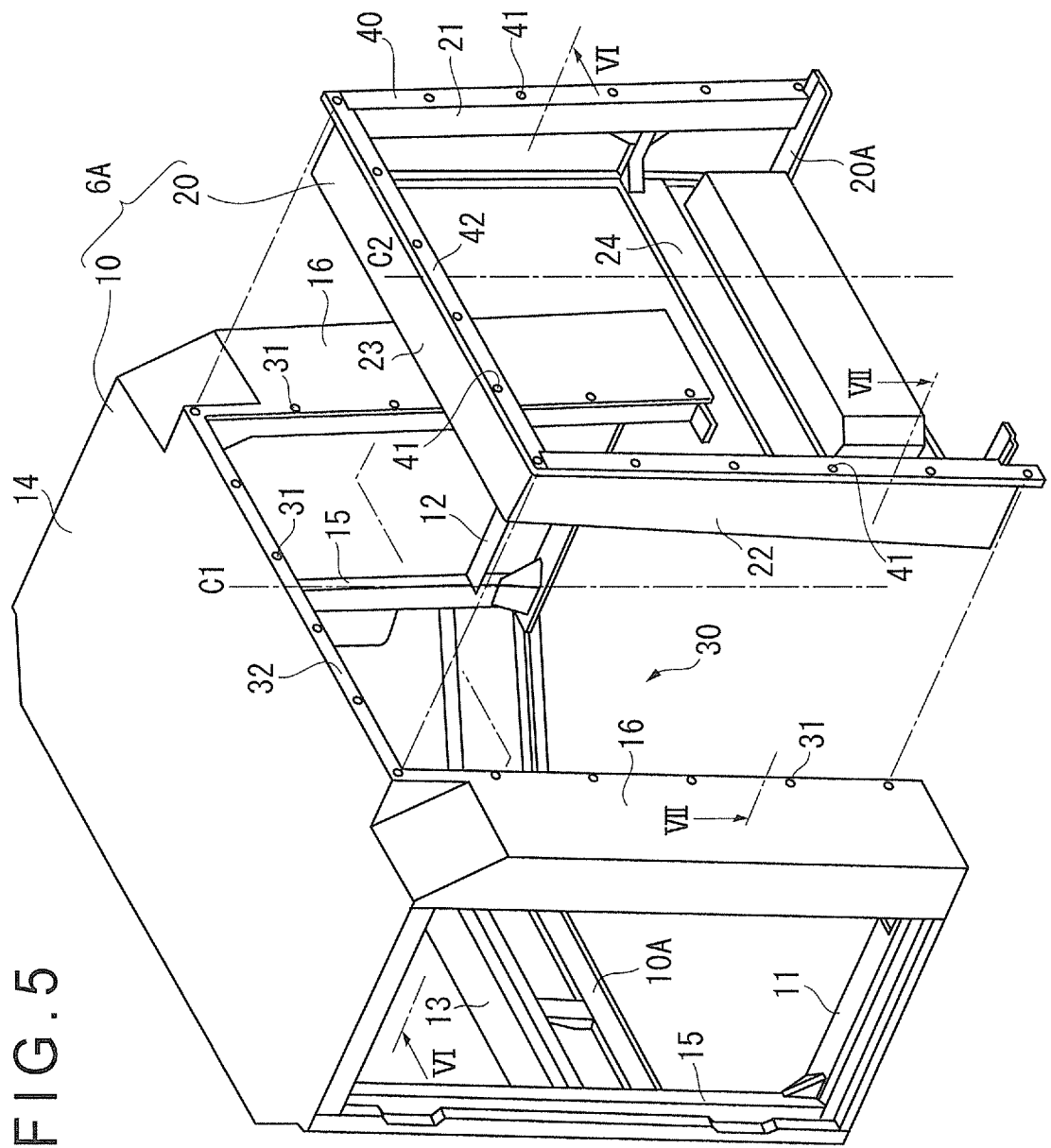
FIG. 5 is an exploded perspective view showing the cab frame in a coating process.

As shown in FIG. 5, in preparation for coating of the cab frame 6A, the rear structure 20 is turned back to front relative to the main structure 10 and connected thereto. Since the plurality of insertion holes 41 of the connector 42 of the rear structure 20 are arranged bilaterally in line symmetry with one another, the rear structure 20 is turned back to front without changing the arrangement of the insertion holes 41 and thus the insertion holes 41 are still opposed to the bolt holes 31 of the connector 32 of the main structure 10.

Figure 6:
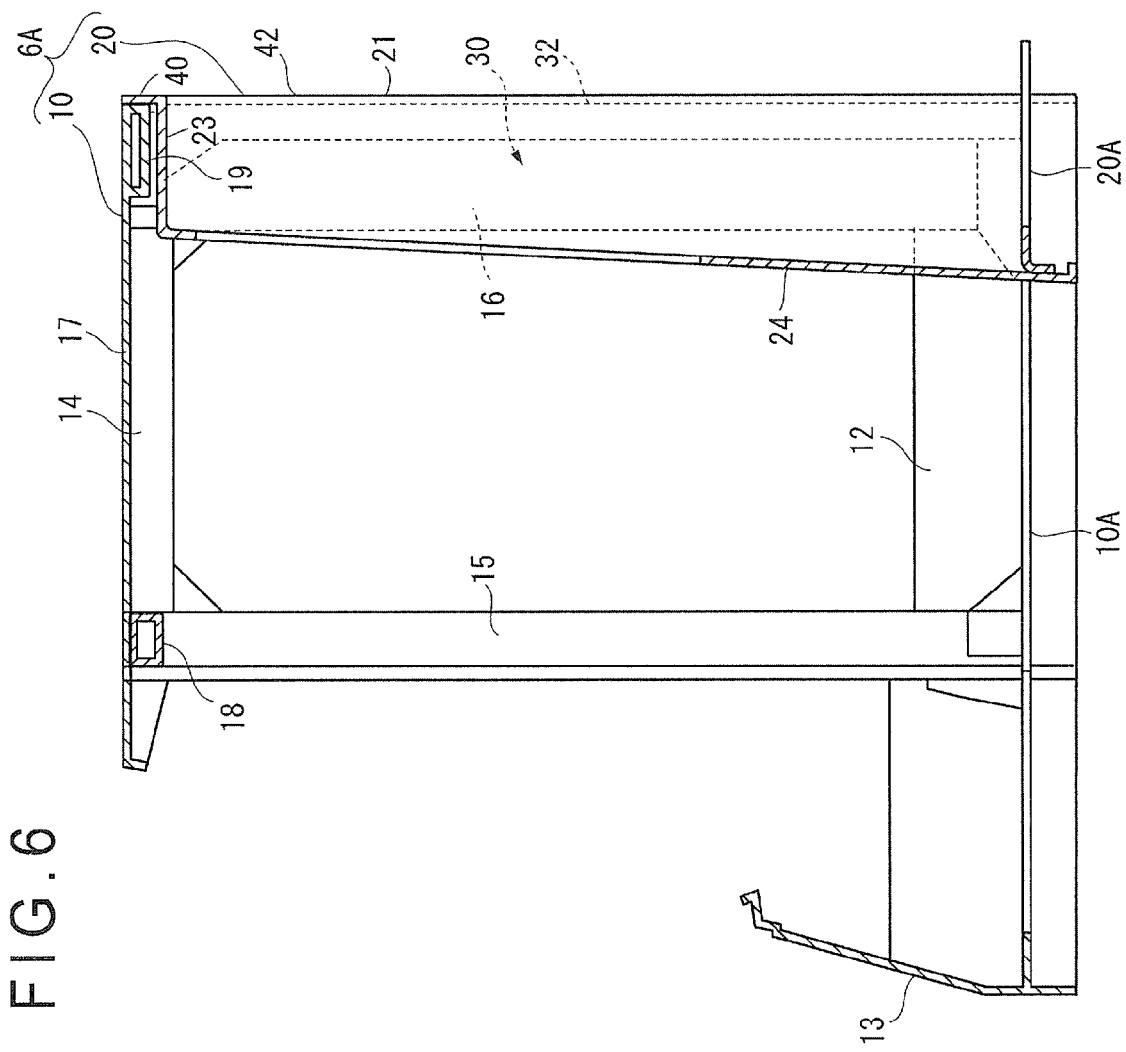
FIG. 6 is a sectional side view, taken along a line VI-VI in FIG. 5, showing the cab frame in the coating process.

As shown in FIG. 6, when the rear structure 20 is turned back to front and connected to the main structure 10, a box-shaped portion provided by the side members 21, 22, the top member 23, and the rear member 24 of the rear structure 20 is housed in the main structure 10 through the opening 30, so that the rear structure 20 hardly projects rearward from the main structure 10. Thus, the cab frame 6A is down-sized as a whole, especially, in the front-and-rear direction by an amount corresponding to the rear structure 20, so that the cab frame 6A can be entirely immersed in an electrodeposition bath (coating bath) for cationic coating.

Figure 7:
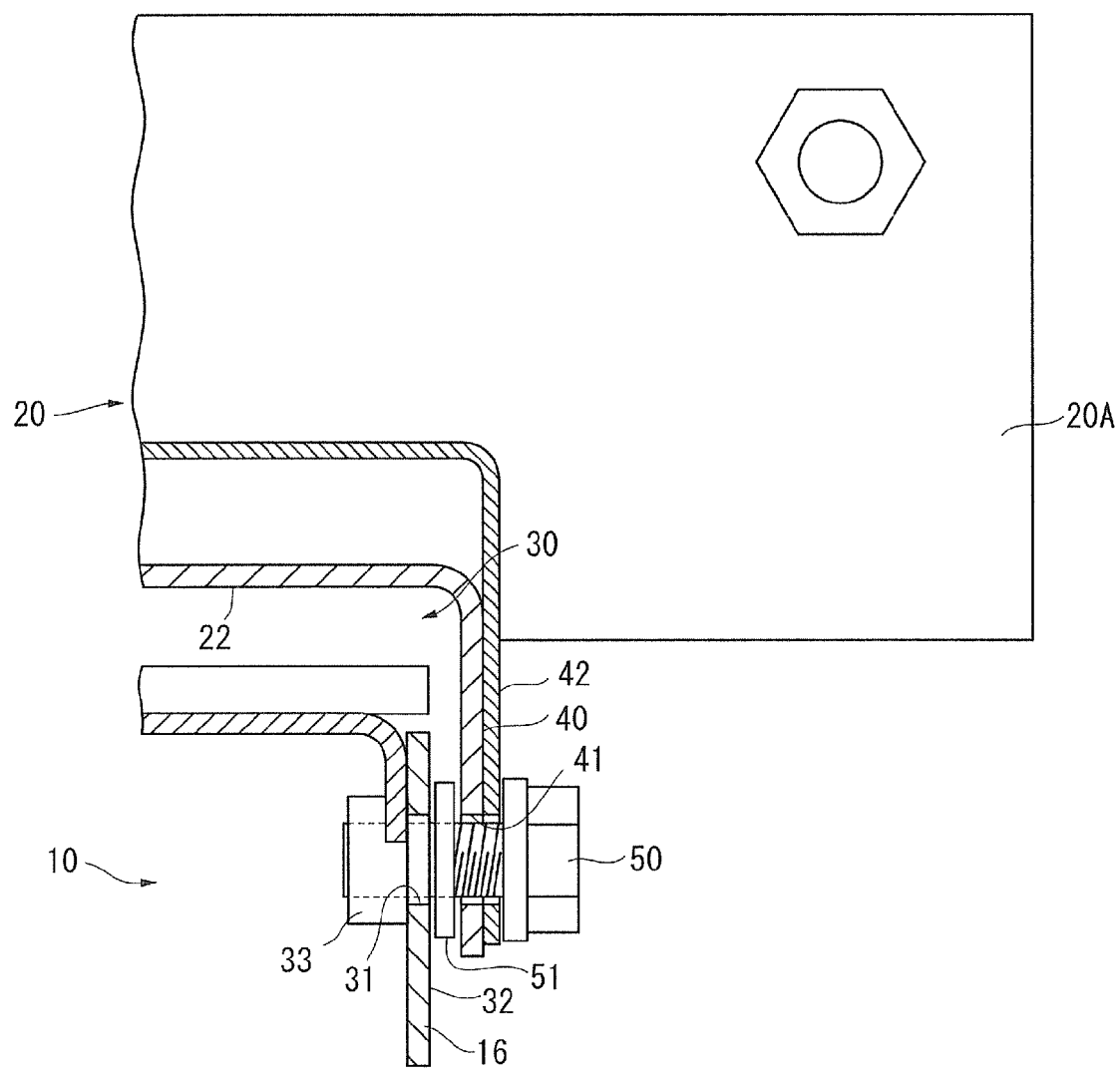
FIG. 7 is a sectional side view, taken along a line VII-VII in FIG. 5, showing a relevant part of the cab frame in the coating process.

FIG. 7 shows a transverse section of a part of the connection arrangement between the main structure 10 and the rear structure 20 in the coating process. When the rear structure 20 is connected to the main structure 10 to be housed therein, the bolt hole 31 and the insertion hole 41 of the connectors 32, 42 are opposed to each other. The bolt 50 is inserted through the bolt hole 31 and the insertion hole 41 to be screwed into the back nut 33 fixed on the back of the bolt hole 31.

Further, a washer 51, which is put on the bolts 50, is interposed between the connectors 32, 42. For the coating process, the bolt 50 is fixed but not fully tightened. Thus, the connectors 32, 42 are spaced from each other by a clearance provided by a gap slightly larger than the thickness of the washer 51, so that electrodeposition coating is reliably effected even on opposed surfaces of the connectors 32, 42 through the gap.

Connection at the other bolt holes 31 and insertion holes 41 is the same as the connection as described above. It should be noted that it is not necessary to screw the bolts 50 in all the bolt holes 31 and insertion holes 41 for the coating process. Specifically, the connectors 32, 42 may be fixed at only a part of the bolt holes 31 and insertion holes 41 as long as the connectors 32, 42 are not detached from each other in a coating line. In view of the above, all of the bolt holes 31 and the insertion holes 41 may be not arranged bilaterally in line symmetry with one another as long as at least a pair of the bolt holes 31, at which the connectors 32, 42 are to be fixed with the bolts 50, are arranged bilaterally in line symmetry with each other and at least a pair of the insertion holes 41 are arranged bilaterally in line symmetry with each other.

A coating method for the cab frame 6A will be described with reference to FIG. 8.

As shown in FIG. 8, after manufactured through a cab-production line 100, the main structure 10 and the rear structure 20 are first wiped through a metal-wiping process 101 before being fed into an electrodeposition-coating line 110. In the metal-wiping process 101, iron powder or the like adhered on the main structure 10 and the rear structure 20 is wiped off with waste cloth. Subsequently, the rear structure 20 is turned back to front and fixed to the main structure 10 as one piece as shown in FIG. 6.

In the electrodeposition-coating line 110, the structures 10, 20 fixed as one piece are first subjected to a series of pretreatments including hot-water rinsing, pre-degreasing, degreasing, water rinsing, surface treatment, forming and pure-water rinsing that are performed in this order (a pretreatment process 111). Next, after being pretreated, the structures 10, 20 are immersed in an electrodeposition bath filled with a material for cationic electrodeposition coating to be subjected to electrodeposition coating (an electrodeposition-coating process 112). Subsequently, after rinsed with pure water, the structures 10, 20 are put in a stove to be dried (a drying process 113).

After being subjected to the drying process 113, the structures 10, 20 are unfixed by removing the bolts 50 therefrom and separated from each other. The rear structure 20 is then turned back to front and normally connected to the main structure 10 to be assembled into the cab frame 6A as designed (an assembling process 114). The thus-assembled cab frame 6A is fed into a finish-coating line 120. In the finish-coating line 120, for instance, a finish-coating robot is operated to finish-coat the cab frame 6A. Incidentally, when the cab frame 6A is completed, a sealant is applied between the connectors 32, 42 to ensure airtightness.

It should be appreciated that the scope of the invention is not limited to the above exemplary embodiment but modifications and improvements that are compatible with an object of the invention are included within the scope of the invention.

In the exemplary embodiment, for instance, the sub structure according to the invention is exemplified by the rear structure 20, and the main structure 10 is increased in size as compared with the rear structure 20 so that the rear structure 20 can be housed in the main structure 10 in the coating process. This arrangement, however, may be replaced with such an arrangement that the main structure is a large-sized rear structure while the sub structure is a front structure connected to a front side of the main structure, the front structure being housed in the main structure in the coating process.

In the above exemplary embodiment, since the front-and-rear length of the cab frame 6A is not acceptable to the electrodeposition bath, the main structure 10 and the rear structure 20 are configured to be separable from each other. However, such an arrangement that the structures are separable in the front-and-rear direction as in the exemplary embodiment may be replaced with any other arrangement. For instance, when the right-and-left width of the cab frame is too large to be acceptable to the electrodeposition bath, the cab frame may be divided into three parts such as a pair of side structures provided by right and left side panels (the sub structure) and the main structure located therebetween or, alternatively, into two pars such as a side structure provided by one of the side panels (the sub structure) and the main structure provided by the rest of the cab frame.

While the main structure is used commonly in construction machines different in type or specification, there may be prepared sub structures different in front-and-rear length replaceable depending on the type or specification (e.g., option) of a construction machine so that the invention is applicable to a variety of construction machines.

The invention claimed is:

1. A cab frame for a construction machine, the cab frame comprising:
   a main structure having an opening on a part of an outer surface thereof;
   a sub structure being separably connected to the main structure to cover the opening while projecting from the main structure; and
   first and second connectors being provided to the main structure and the sub structure, respectively, the first and second connectors being connected to each other in an abutted manner when the main structure and the sub structure are connected to each other, wherein
   when the sub structure is connected to the main structure after being turned back to front relative to the main structure, the sub structure is fixable to the main structure via the first and second connectors, and
   when the sub structure is turned back to front relative to the main structure and connected to the main structure, the sub structure is housed in the main structure.

2. The cab frame for the construction machine according to claim 1, wherein
   the main structure has the opening at a rear side thereof,
   the sub structure is a rear structure that is connected to the main structure to cover the opening of the main structure, and
   the main structure comprises hollow upright columns being squarely arranged at intervals.

3. The cab frame for the construction machine according to claim 2, wherein
   the construction machine comprises columns for a roll over protective structure, and
   the first and second connectors of the main structure and the rear structure each comprise right and left sides that are adjacent to the columns of the construction machine.

4. A coating method for a cab frame for a construction machine, the cab frame comprising: a main structure having an opening on a part of an outer surface thereof; a sub structure being connected to the main structure to cover the opening while projecting from the main structure; and first and second connectors being provided to the main structure and the sub structure, respectively, the cab frame being dividable at the first and second connectors of the main structure and the sub structure, the coating method comprising:
   connecting the sub structure to the main structure after the sub structure is turned back to front relative to the main structure;
   fixing the sub structure to the main structure via the first and second connectors with the sub structure being housed in the main structure; and
   immersing the cab frame in a coating bath.

* * * * *